United States Patent [19]

Klinge

[11] 4,264,258
[45] Apr. 28, 1981

[54] ROTATABLE SCREW CONVEYOR FOR DISCHARGING CHIP SILOS

[75] Inventor: Hans-Peter Klinge, Detmold, Fed. Rep. of Germany

[73] Assignee: Ing. Herbert Nolting GmbH & Co. Kommanditgesellschaft, Detmold, Fed. Rep. of Germany

[21] Appl. No.: 970,588

[22] Filed: Dec. 18, 1978

[51] Int. Cl.$^3$ .......................... B65G 65/00; B65G 1/00
[52] U.S. Cl. ...................................... 414/309; 222/412
[58] Field of Search .................... 414/309–312, 414/468; 222/410–414

[56] References Cited

U.S. PATENT DOCUMENTS

| | | | |
|---|---|---|---|
| 3,104,022 | 9/1963 | Shäffler et al. | 414/468 |
| 3,252,597 | 5/1966 | Hildebrand | 414/310 |
| 3,490,617 | 1/1970 | Mast et al. | 222/412 |
| 3,908,839 | 9/1975 | Menaut | 414/310 |
| 3,990,590 | 11/1976 | Zompetta | 414/468 |

FOREIGN PATENT DOCUMENTS

| | | | |
|---|---|---|---|
| 511782 | 1/1921 | France | 222/412 |
| 516457 | 12/1971 | Switzerland | 414/309 |

*Primary Examiner*—Robert W. Saifer
*Assistant Examiner*—L. E. Williams
*Attorney, Agent, or Firm*—Sughrue, Rothwell, Mion, Zinn and Macpeak

[57] ABSTRACT

A screw conveyor 14 is mounted on the sub-floor 11a of a chip silo 11, and rotates as a radial arm to convey the chip material into a cover 17 through an inlet opening 18 and to a central discharge shaft 12. The cover 17 rotates together with the screw conveyor, and has a spiral cross-section with its radial step or break disposed on the conveyor axis. The cover radius continually increases in the direction of rotation, to thereby prevent the column of chip material in the silo from exerting a braking force on its side wall.

1 Claim, 3 Drawing Figures

ROTATABLE SCREW CONVEYOR FOR DISCHARGING CHIP SILOS

BACKGROUND OF THE INVENTION

This invention relates to an apparatus for emptying or discharging chip silos or the like by means of a screw conveyor disposed on the bottom or floor of the silo. The conveyor rotates about its own axis in the usual manner and also in a horizontal plane or about a conical surface of revolution to convey the chip material to a central discharge shaft, which is closed or sealed off except for an opening approximating the cross-sectional area of the conveyor screw by a generally cylindrical cover which itself rotates together with the screw conveyor. The cover is spiral-shaped in cross-section, and the step or break between the largest and the smallest radii thereof lies in the plane of the screw conveyor axis whereby the radius of the cover continually increases in the direction of its rotation.

The basic object of the invention is to further develop and improve known devices of this type, such as that disclosed in Swiss Pat. No. 516457. Although such a prior art apparatus generally performs satisfactorily, under certain conditions, particularly when fine and/or very moist chips are being discharged, the cover which rotates with the screw conveyor about a vertical axis tends to bind against the surrounding chips. This is due to the compression of the chip column in the silo, which forces them against the sides of the cover so that they exert a strong braking effect thereon in the manner of brake shoes on a brake drum. This braking effect can, in an extreme case, become so great that the rotating cover and screw conveyor are brought to a complete halt.

SUMMARY OF THE INVENTION

The particular object of the invention is thus to provide such a rotating screw conveyor discharge apparatus in which the braking and blocking ordinarily caused by fine or moist chips is positively prevented. Thus, and according to the present invention, the rotary, generally cylindrical shaped central cover member has a spiral cross-section with the radial step between the largest and smallest radii thereof lying in the axial plane of the screw conveyor. The cover is oriented or disposed such that its radius continually increases in the direction of its rotation.

With such a construction the screw conveyor eats into the chip material with its threads and moves the material along its axis toward a central discharge shaft while simultaneously rotating together with the cover about a vertical axis. Owing to the spiral shape of the cover it continuously disengages itself from the surrounding chip material to thereby prevent any blocking or braking of the apparatus. The linear analogy would be that of moving a reverse oriented wedge member through the chip material with the conveyor disposed at the leading base or blunt edge of the wedge to remove the material from its path as it is advanced.

DETAILED DESCRIPTION OF THE PREFERRED EMBODIMENT

Figure 1:
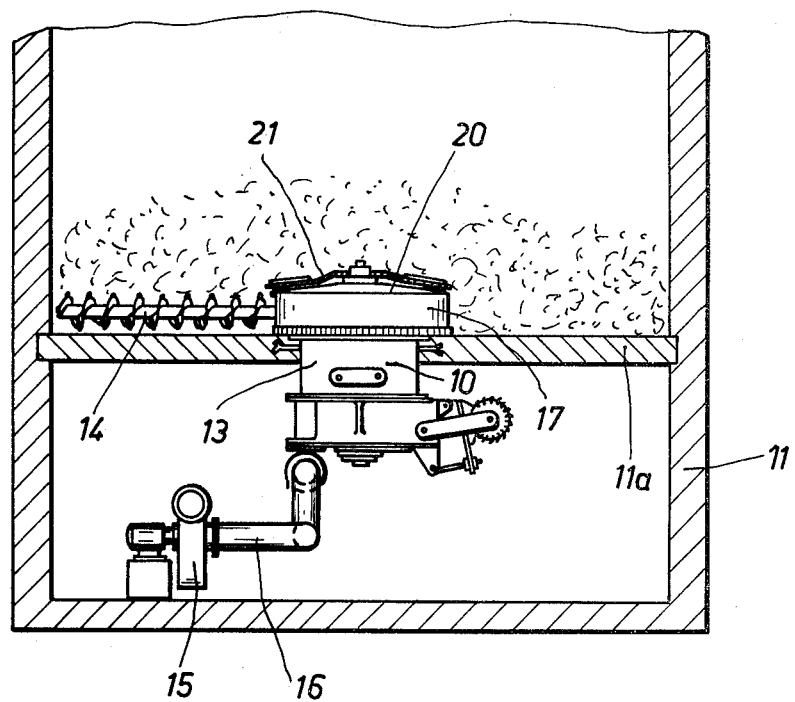
FIG. 1 shows a schematic cross-sectional elevation of an apparatus according to the invention disposed in a chip silo for the emptying or discharge thereof.
Figure 2:
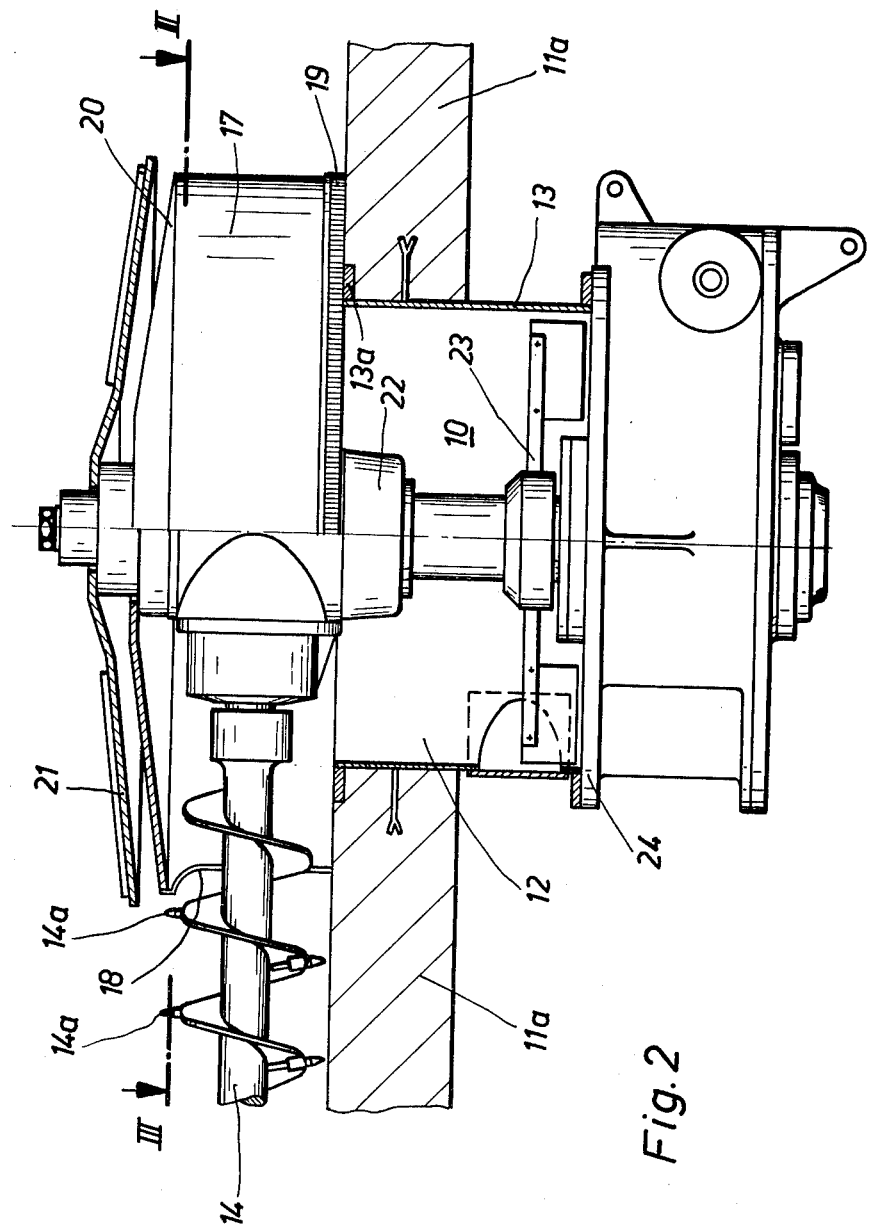
FIG. 2 shows an enlarged partial cross-section of the screw conveyor and central cover assembly mounted over the silo discharge shaft.
Figure 3:
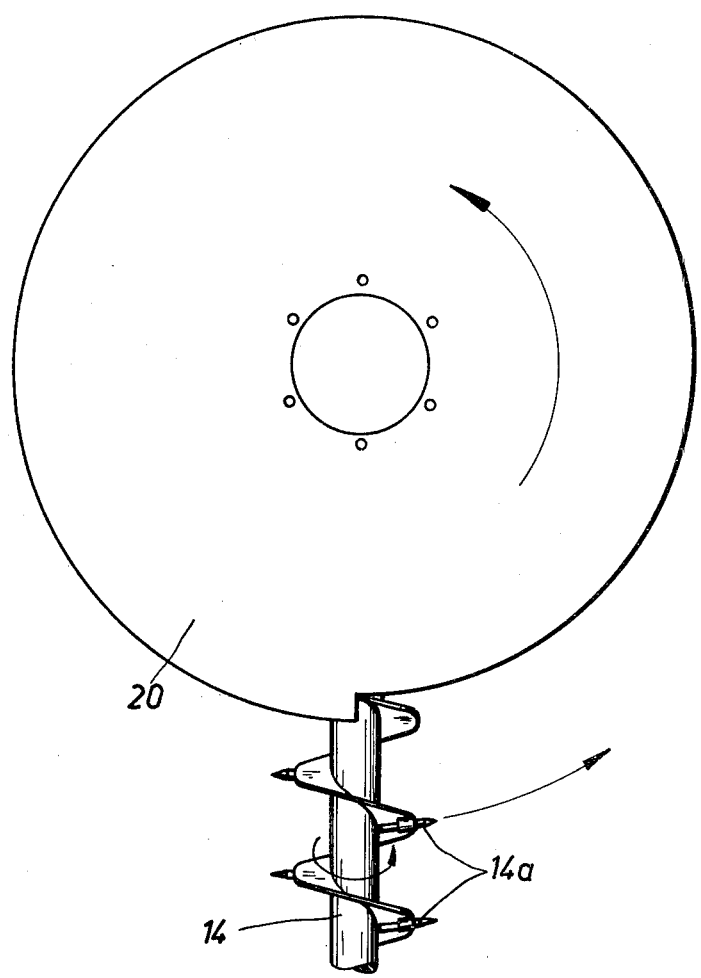
FIG. 3 shows a simplified schematic plan view taken along line III—III in FIG. 2, with non-essential elements omitted.

Referring now to the drawings, the apparatus 10 of the invention for discharging chip silos or the like is detachably mounted in the bottom area of a chip silo 11 and has a cylindrical housing 13 attached to a sub-floor 11a of the silo to thus define a central discharge shaft 12. A screw conveyor 14 provided with replaceable conveyor points 14a rotates axially and in a horizontal plane or about a conical surface or revolution to convey the chip material in the silo toward the discharge shaft, from which it is transported through tubular channels 16 by a blower 15 to an incinerator.

The screw 14 rotates about a vertical axis and thereby turns on the silo sub-floor 11a. The mounting point of the screw conveyor is disposed in the area of the discharge shaft 12, and the vertical rotation axis of the conveyor thus coincides with the longitudinal axis of the discharge shaft.

The shaft 12 is closed off at its upper end by a cover 17 except for an area approximating the cross-section of the screw conveyor, and this cover rotates together with the screw conveyor. Accordingly, an inlet opening 18 of the cover 17 encloses the end portion of the screw conveyor near the discharge shaft so that the exiting chip material can be moved into the discharge shaft by the screw conveyor only through the inlet opening. This inlet opening 18 of the cover 17 is formed in the generally cylindrical cover casing, whose lower side opens into the discharge shaft 12 through a plurality of vertical, parallel, tangential cuts whose opening edges are in the shape of inverted U's.

The true cross-section of the cover 17 has a spiral shape, with the step or break between the largest and smallest radii lying in the plane of the axis of the screw conveyor. The radius of the spiral cover thus continually increases in the direction of rotation thereof. On the lower edge of the casing surface toward the discharge shaft, the cover is provided with a sealing element such as an annular brush 19 which slides along the peripheral edge 13a of the shaft casing, thus sealing the discharge shaft 12 from the silo chamber in the area of its contact with the cover 17.

The cover 17 is provided with a conical upper surface 20 which extends above the screw conveyor 14. The apex of this conical surface coincides with the rotational axis of the cover. Above the cover 17 is disposed a feed element 21 such as a cross-shaped member, which rotates faster than the cover and is equipped with radial wings disposed at an angle to the axis of rotation and which project beyond the cover casing or diameter.

The feed element 21 rotates in a generally horizontal plane a slight distance above the surface 20 of the cover, whereby a cushion of chip material forms between the cover surface and the feed element. By means of the feed element 21 rotating faster than the cover 17, the angled wings, and the conical cover surface 20, this cushion of chip material thus exterts a thrust effect on the cover 17 by means of which the rotational speed of the screw conveyor 14 is increased to a certain extent.

The screw conveyor 14 and the cover 17 are attached to a common drive head 22 for rotational movement, the drive head being disposed within the cover 17 and discharge shaft 12 so that the screw conveyor and cover are effectively coupled together for purposes of rotation. The axial rotation of the screw conveyor is provided by bevel gears or the like mounted inside the drive head 22.

A further feed element 23 is disposed in the discharge shaft 12 beneath the cover 17 and drive head 22. Like the feed element 21 this further feed element 23 is rotatably mounted and delivers the chip material conveyed into the discharge shaft to one or more openings 24 through which the chip material passes into the exit channels 16.

The further or lower feed element 23 is positively connected to the upper feed element 21, and both are driven together independently of the cover and screw conveyor rotation. As the screw conveyor 14 rotates the chip material in the silo 11 is transported to the inlet opening 18 and passes therethrough into the cover 17 and the discharge shaft 12. The upper feed element 21 serves to loosen the chip material and prevent its crusting or caking above the cover 17.

By means of the cover 17 closing off the discharge shaft except for the inlet opening 18 whose size approximates the cross-section area of the screw conveyor, the uncontrolled forcing of the chips into the discharge shaft and exit channels 16 is prevented, and simultaneously the stoppage or plugging of the apparatus is precluded because the chips can only travel into the discharge shaft in the area of the screw conveyor.

I claim:

1. In an apparatus for discharging chip silos or the like including a radially oriented screw conveyor disposed on the bottom of the silo, a central discharge opening in the silo bottom, a cover member disposed above the discharge opening, an inlet opening in the side of the cover member through which the screw conveyor extends, means for axially driving the screw conveyor, and means for rotationally driving the screw conveyor and the cover member together, whereby the screw conveyor conveys chip material or the like in the silo through the cover member inlet opening and into the discharge opening, the improvements characterized by:

(a) the cover member having a radially outward outside surface formed in the shape of a spiral,
(b) the cover member transition from the largest to the smallest radii lying on the vertical plane through the axis of the screw conveyor, and
(c) the cover member being so oriented that its radius continually increases in its direction of rotation.

* * * * *